United States Patent
Huang

(10) Patent No.: US 7,114,862 B2
(45) Date of Patent: Oct. 3, 2006

(54) SINGLE FOCUS LENS MODULE

(75) Inventor: Yeo-Chih Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 107 days.

(21) Appl. No.: 10/910,729

(22) Filed: Aug. 3, 2004

(65) Prior Publication Data

US 2006/0029385 A1 Feb. 9, 2006

(51) Int. Cl.
*G03B 9/10* (2006.01)
(52) U.S. Cl. .............. 396/452; 396/448; 396/493; 348/362; 348/374
(58) Field of Classification Search ........... 396/451, 396/462, 533, 448, 449, 452, 493; 348/362–366, 348/207.99, 335, 373–376
See application file for complete search history.

(56) References Cited

U.S. PATENT DOCUMENTS

| | | | | |
|---|---|---|---|---|
| 4,873,542 A | * | 10/1989 | Nakayama | 396/144 |
| 6,097,897 A | * | 8/2000 | Ide | 396/93 |
| 2003/0174412 A1 | * | 9/2003 | Noguchi | 359/694 |

* cited by examiner

*Primary Examiner*—W. B. Perkey
*Assistant Examiner*—Rishi Suthar
(74) *Attorney, Agent, or Firm*—Charles E. Baxley

(57) ABSTRACT

A single focus lens module includes a mechanical shutter taking lens assembly and there are front lens shutter module, taking lens and holder from the object side to the image side. The taking lens is connected to the holder by threading. The front taking lens assembly is connected the taking lens. The focus of the taking lens can be adjusted to a proper position by threads and the shutter module is then assembled. By this arrangement, the structure of the single focus lens module can be simplified and the precision of the assembly is improved.

2 Claims, 3 Drawing Sheets

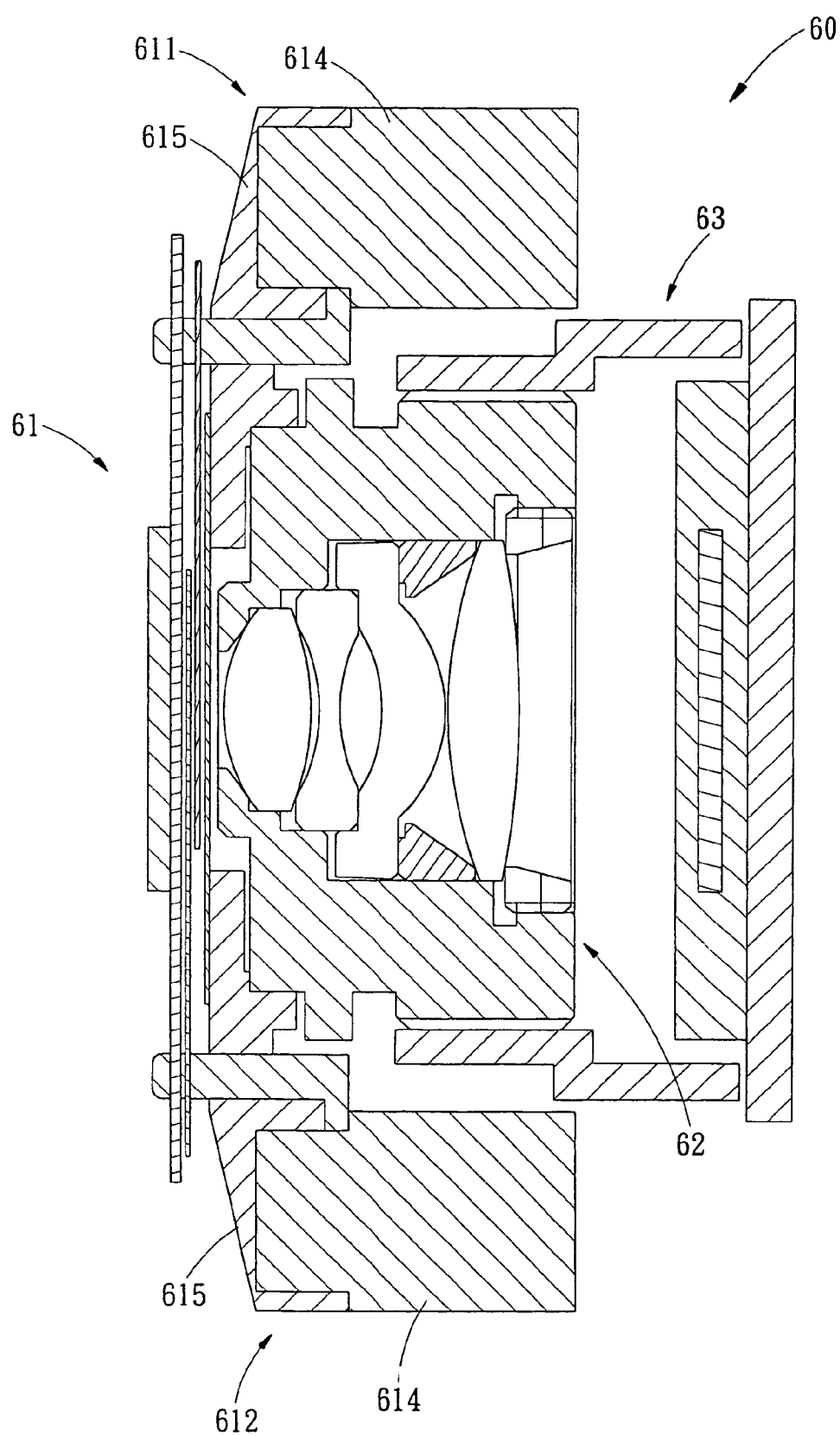
F I G. 2

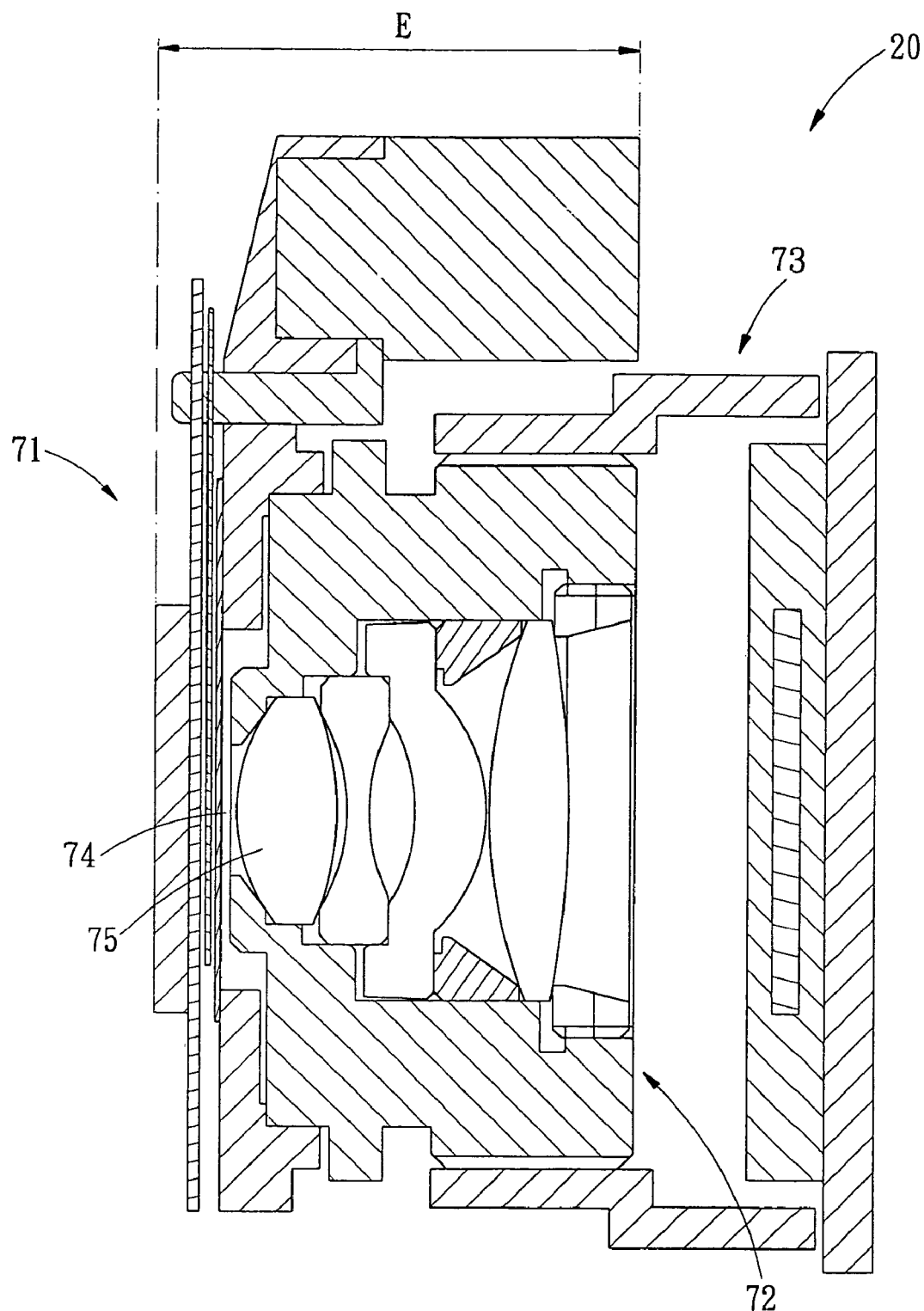
F I G. 3

SINGLE FOCUS LENS MODULE

FIELD OF THE INVENTION

The present invention relates to a single focus lens module of digital camera, especially for a single focus lens module.

BACKGROUND OF THE INVENTION

Parts for a conventional single focus lens module for digital camera from the object side to the image side are (1) photo taking lens which includes a mechanical shutter; (2) lens holder assembly which includes focus adjusting mechanism; (3) electronic photo taking assembly wherein the light sensor can be CCD or CMOS. The mechanical shutter is activated by mechanical interaction and electronic transferring action with the circuit board, so that the orientation of the shutter has to be set and cannot be rotated about the optical axis of the lens. In order to make the images formed on the light sensor and obtain a better quality image, a focus adjusting mechanism that is able to move linearly is connected to the lens holder so as to prevent the photo taking lens from rotating. Nevertheless, there are shortcomings as follows:
  1. In order to allow the lens to move back and forth, gaps exist between parts of the focus adjusting mechanism. Tolerances are accumulated between the parts between the photo taking lens and the light sensor. The number of the parts is increased, the accumulated tolerances are severe so that the optical axis is not perpendicular to the light sensor and the image tilts.
  2. Mechanical shutter body is located in the photo taking lens so that the photo taking lens has to be assembled from two sides of the shutter. This makes the optical axis be slightly different and the quality of the image is reduced.
  3. Mechanical shutter body is located in the photo taking lens and is activated by an actuator. In order not to interrupt the actuator and the focus adjusting mechanism, the actuator is arranged in front of the aperture stop and this arrangement makes the whole lens module to be too thick.

SUMMARY OF THE INVENTION

The primary object of the present invention is to provide a single focus lens module wherein the aperture stop of the image lens is arranged in front of the first lens and by this arrangement, the mechanism shutter and the image lens are two individual bodies. Because the image lens and the shutter body are separated so that the image lens can be connected to the lens holder by threading. The focusing can be done by rotating the image lens and other parts of the focus adjusting mechanism can be omitted. After the focus is set, the shutter body is connected of the image lens directly so as to ensure the orientation of the shutter body and the orientation will not changed during focusing. The distance between the shutter and the aperture stop is not changed during focusing. By this way, the quality of assembling can be improved.

The single focus lens module has the following features:
  1. The focal length of the lens is less than 15 mm. The image lens is not moved after the focus is set so that the focal length has to be small so as to have enough depth of field and this allows the user not to focus when in use.
  2. The actuator of the shutter module is located behind the shutter leaf so as to save the space of the single focus lens module and the camera is compact.
  3. A distance between the front surface of the shutter module and the front surface of the lens barrel is less than 2.0 mm so as to avoid that the aperture of the shutter is too large and the travel distance of the shutter leaf is too long and slow.
  4. A distance between the bottom of the actuator for the shutter module and the front surface of the shutter body is less than 12 mm so as to avoid interruption between the actuator, the electronic image taking parts and the lens holder.
  5. The control for the shutter module can be made by using solenoid and control bar to push the shutter leaf so as to simplify the action of the shutter actuator and speed up the action of the shutter.
  6. A distance between the shutter module and the aperture stop of the single focus lens module is less than 1 mm so as to reduce the travel length of the shutter leaf and to increase the speed of the shutter. The light is not hidden on the periphery of the image when the aperture stop is adjusted to be small.
  7. The lens holder and the electronic image taking parts are connected with each other so as to reduce the number of the parts from the image lens to the electronic image taking parts. The precision of assembly can be improved.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 2 is a cross sectional view for another preferred embodiment of the present invention, and FIG. 3 is a cross sectional view for yet another preferred embodiment of the present invention.

DETAILED DESCRIPTION OF THE PREFERRED EMBODIMENT

Figure 1:
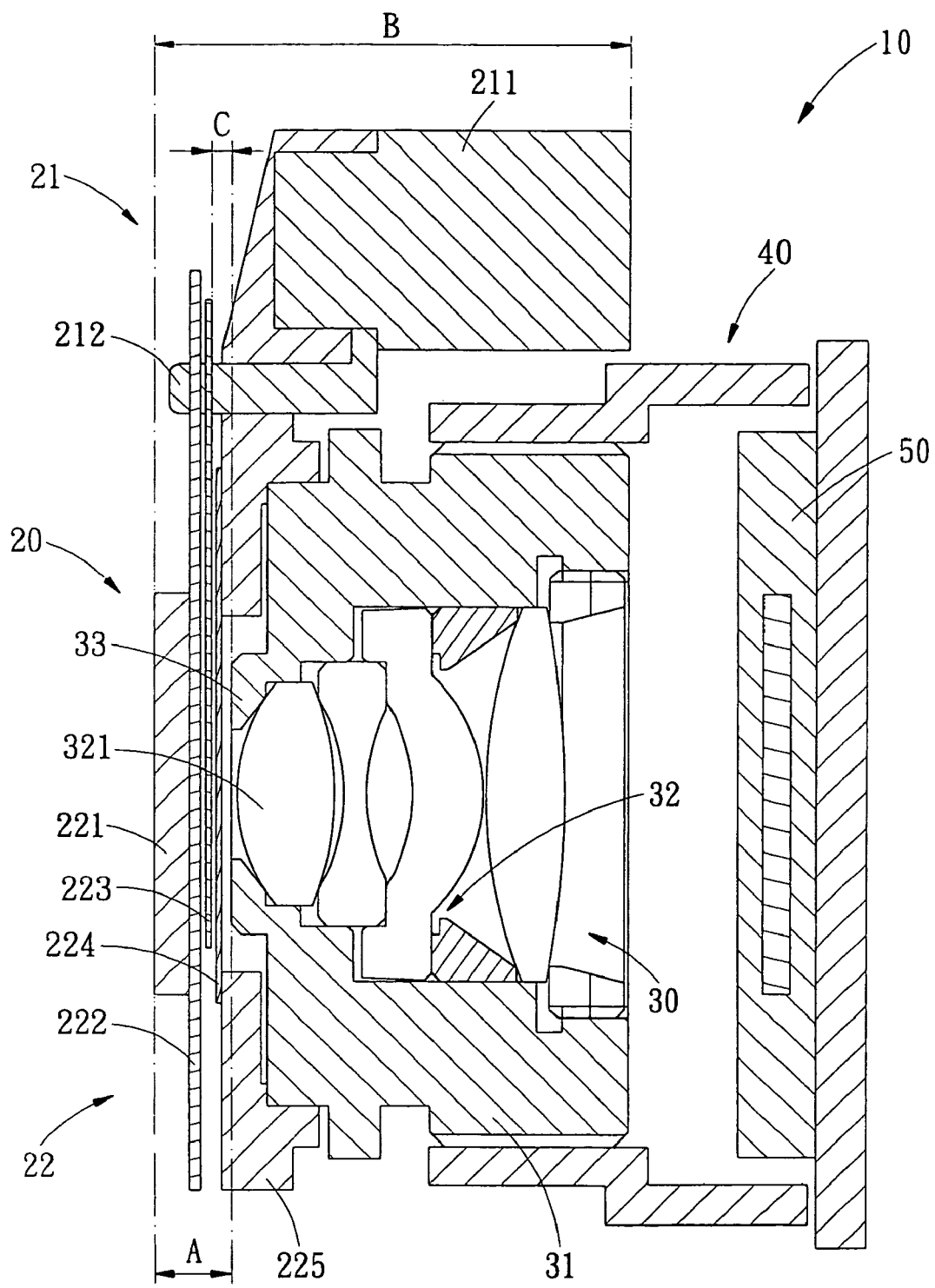
FIG. 1 is a cross sectional view for a preferred embodiment of the present invention.

Referring to FIG. 1, the single focus lens module 10 of the present invention comprises an image lens module 20 of a mechanical shutter and the lens module 20 includes a front shutter module 20, an image lens 30 and a lens holder 40 from the object side to the image side.

The front shutter module 20 is composed of a shutter actuator 21 having a solenoid 211 and a control bar 212 so as to control the front shutter module and a shutter body 22 having a top cover 222, a shutter leaf 223, a fixed leaf 224 and a base plane 225. The shutter body 22 is connected to the taking lens 30. The actuator 21 is located behind the shutter leaf 223 and the distance between the front surface of the shutter module and the front surface of the lens barrel is less than 2.0 mm. A distance between the rear end of the actuator for the shutter module and the front surface of the shutter body is less than 12 mm. The shutter leaf 223 is moved by shifting the control bar 212 which is controlled by the solenoid 211 of the actuator 21. A distance "C" between the shutter leaf 223 and the aperture stop of the single focus lens module 10 is less than 1 mm.

The taking lens 30 is composed of a lens barrel 31 and a lens assembly 32, wherein the aperture stop 33 of the taking lens 30 is located in front of the first lens 321 and the taking lens 30 is connected to the holder 40 by threading. The focal length is less than 15 mm.

The holder 40 is connected with an electronic taking assembly 50 (such as a charge-coupled device, known as CCD) and the holder 30 is connected to the taking lens 30 by threading.

Referring to FIG. 2, the single focus lens module 60 of the second preferred embodiment of the present invention includes a front shutter module 61, a taking lens 62 and a holder 63 from the object side to the image side. The single focus lens module 60 and the single-focus lens module 10 in the first embodiment is similar so that it will not be described in detail. The difference is that the front shutter module 61 includes two actuators 611, 612 which are respectively composed of an solenoid 614 and a control bar 615. The actuator 611 controls the shutter of the front shutter module 61 and the actuator 612 controls the action of changing of the aperture stop of the front shutter module 61.

The third preferred embodiment of the present invention is shown in FIG. 3 and the single focus lens module 70 includes a front shutter module 71, a taking lens 72 and a holder 73 from the object side to the image side. The single focus lens module 70 includes an aperture stop 74 and is composed of fixed leaf of the shutter module and located in front of the first lens 75. The taking lens 72 is connected to the holder 73 by threading and the focal length is less than 15 mm.

When using the aperture stop of the front shutter module, simply connecting it to the lens assembly. Even if the central line of the single focus lens module is off will not affect the function for taking photos. Because the lens and the holder are connected by threading so that the structure is simplified and precision of the assembly can be increased.

While we have shown and described the embodiment in accordance with the present invention, it should be clear to those skilled in the art that further embodiments may be made without departing from the scope of the present invention.

What is claimed is:

1. A single focus lens module comprising:

a mechanical shutter taking lens assembly composed of a front lens shutter module, a taking lens and a holder from object side to image side, the taking lens having an aperture stop which is located in front of a first lens, the taking lens connected to the holder by threading;

wherein front shutter module is composed of a shutter body and a shutter actuator, the shutter body connected to the taking lens, the shutter body includes a base plane, a top cover, a shutter leaf and a fixed leaf;

the shutter actuator located behind the shutter leaf and a distance between a front surface of the shutter body and the lens barrel of the taking lens being less than 2.0 mm.

2. An electronic camera comprising:

a mechanical shutter taking lens assembly, a front lens shutter module, a taking lens and a holder being arranged from a surface of the electronic camera to an electronic sensor, the taking lens having an aperture stop which is located in front of a first lens, the taking lens connected to the holder by threading;

wherein front shutter module is composed of a shutter body and a shutter actuator, the shutter body connected to the taking lens;

the shutter body includes a base plane, a top cover, a shutter leaf and a fixed leaf, the shutter actuator located behind the shutter leaf and a distance between a front surface of the shutter body and the lens barrel of the taking lens being less than 2.0 mm.

* * * * *